US009361155B2

(12) United States Patent  (10) Patent No.: US 9,361,155 B2
Chandhoke et al.  (45) Date of Patent: *Jun. 7, 2016

(54) TIME CRITICAL TASKS SCHEDULING

(71) Applicant: NATIONAL INSTRUMENTS CORPORATION, Austin, TX (US)

(72) Inventors: Sundeep Chandhoke, Austin, TX (US); Herbert K. Salmon, IV, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/839,439

(22) Filed: Aug. 28, 2015

(65) Prior Publication Data

US 2015/0370602 A1  Dec. 24, 2015

Related U.S. Application Data

(63) Continuation of application No. 13/859,030, filed on Apr. 9, 2013, now Pat. No. 9,135,062.

(51) Int. Cl.
  *G06F 9/46* (2006.01)
  *G06F 9/48* (2006.01)

(52) U.S. Cl.
  CPC ............ *G06F 9/4887* (2013.01); *G06F 9/4825* (2013.01); *G06F 2209/486* (2013.01)

(58) Field of Classification Search
  None
  See application file for complete search history.

(56) References Cited

U.S. PATENT DOCUMENTS

| 8,943,505 | B2 | 1/2015 | Chandhoke | |
|---|---|---|---|---|
| 2002/0120661 | A1* | 8/2002 | Binns | G06F 9/4887 718/102 |
| 2005/0015768 | A1 | 1/2005 | Moore | |
| 2008/0148264 | A1* | 6/2008 | Neichev | G06F 9/4843 718/102 |
| 2009/0271796 | A1* | 10/2009 | Kojima | G06F 9/4881 718/103 |
| 2009/0320030 | A1* | 12/2009 | Ogasawara | G06F 9/4825 718/102 |
| 2010/0242041 | A1 | 9/2010 | Plondke | |
| 2012/0284720 | A1 | 11/2012 | Cain | |
| 2014/0109096 | A1 | 4/2014 | Chandhoke | |

OTHER PUBLICATIONS

"HyOS: A Hybrid Operating System Design Approach for Real-Time Systems using Hardware Acceleration;" Insop Song, Ericsson Inc., 14th Real Time Linux Workshop, Oct. 18-20, 2012 at the Department of Computer Science, University of North Carolina at Chapel Hill; pp. 1-7.

\* cited by examiner

*Primary Examiner* — Dong Kim

(74) *Attorney, Agent, or Firm* — Meyertons Hood Kivlin Kowert & Goetzel, P.C.; Jeffrey C. Hood; Brian E. Moore

(57) ABSTRACT

A method and system for scheduling a time critical task. The system may include a processing unit, a hardware assist scheduler, and a memory coupled to both the processing unit and the hardware assist scheduler. The method may include receiving timing information for executing the time critical task, the time critical task executing program instructions via a thread on a core of a processing unit and scheduling the time critical task based on the received timing information. The method may further include programming a lateness timer, waiting for a wakeup time to obtain and notifying the processing unit of the scheduling. Additionally, the method may include executing, on the core of the processing unit, the time critical task in accordance with the scheduling, monitoring the lateness timer, and asserting a thread execution interrupt in response to the lateness timer expiring, thereby suspending execution of the time critical task.

20 Claims, 8 Drawing Sheets

TIME CRITICAL TASKS SCHEDULING

PRIORITY DATA

This application is a continuation of U.S. patent application Ser. No. 13/859,030, titled "A Hardware Assisted Method and System for Scheduling Time Critical Tasks", filed Apr. 9, 2013, whose inventors are Sundeep Chandhoke and Herbert K. Salmon, IV, which is hereby incorporated by reference in its entirety as though fully and completely set forth herein.

FIELD OF THE INVENTION

The present invention relates to a hardware assisted method and system for scheduling time critical tasks.

DESCRIPTION OF THE RELATED ART

Real time systems use time critical tasks to execute program instructions that are required to meet deadlines, e.g., to not run late. Not meeting a deadline is considered catastrophic in hard real time systems. Examples of hard real time systems include engine control systems, industrial process controllers, and various embedded systems which interact at a low level with physical hardware.

There are many techniques for scheduling time critical tasks. A real time scheduler is a critical part of a real time system. It is the responsibility of the real time scheduler to execute tasks in a timely manner. An essential function of the real time scheduler is monitoring scheduled time critical tasks to ensure the time critical tasks are meeting their deadline. Additionally, the real time scheduler must ensure fairness in use of resources of the real time system. For example, in addition to time critical tasks, all real time systems use best effort tasks, e.g., tasks that have no timeliness requirement, to execute non time critical programs such as logging status, responding to user interface commands, monitoring health of the system, and so forth. Hence, it is the responsibility of the real time scheduler to ensure that, although a processing unit's resources are shared between best effort tasks and time critical tasks, the timeliness of time critical tasks is not compromised by the execution of the best effort tasks. Therefore, the real time scheduler is required to pre-empt, or interrupt, the best effort tasks when it is time to execute the time critical tasks again.

However, this functionality of the real time scheduler consumes precious processing unit cycles, especially in instances where it is required to either run multiple time critical tasks, execute the time critical task at high rates, e.g., high frequency cycles, or both. Hardware assisted mechanisms are available which allow the offloading of scheduler calculations to a separate device such as a peripheral device connected to the processing unit via the processor interconnect, e.g., an field programmable gate array (FPGA) or another processing unit. Additionally, non-interrupt based scheduling to improve processor unit usage by elimination of the overhead associated with interrupts is available.

However, there is a need for a real time scheduler that monitors deadlines for time critical tasks while ensuring fairness in processing unit resource sharing between the time critical tasks and best effort tasks without compromising timeliness in waking up the time critical tasks.

SUMMARY OF THE INVENTION

Various embodiments of a system and method for scheduling time critical tasks are presented below.

The method for monitoring a time critical task may include receiving timing information for executing the time critical task, where the time critical task may execute program instructions via a thread on a core of a processing unit. The method may further include scheduling the time critical task, where the scheduling may include determining, based on the received timing information, a wakeup time, a thread cycle time, an overall thread deadline, and a time critical task deadline. In some embodiments, the overall thread deadline may be the difference between the thread cycle time and a system dependent suspend latency. In certain embodiments, the time critical task deadline may be a function of the overall thread deadline and a specified thread bandwidth, where the specified thread bandwidth may indicate a fraction of the thread cycle time reserved for the time critical task.

The method may further include programming a timer, e.g., a lateness timer, based on the wakeup time and the time critical task deadline, and waiting for the wakeup time to obtain, e.g., waiting for the wakeup time to arrive. Further, the method may include notifying the processing unit of the scheduling, where the notifying may indicate to the processing unit that the thread is in an idle state. The idle state may indicate that the thread is awake and ready to resume execution and execute the time critical task in accordance with the scheduling.

Additionally, the method may include executing, on the core of the processing unit, the time critical task in accordance with the scheduling. Further, the method may include monitoring the lateness time and asserting a thread interrupt in response to the lateness timer expiring, where asserting the thread interrupt interrupts the executing, thereby suspending execution of the time critical task. In certain embodiments, suspending execution of the time critical task may include suspending execution of the thread and returning the thread to the idle state, thereby ensuring a timely wakeup of the thread for execution of another cycle of the time critical task.

In some embodiments, notifying the processing unit of the scheduling may include a memory write to a memory of the processing unit. In such embodiments, the method may further include monitoring the memory, by the processing unit, for the memory write to indicate the notifying of the scheduling.

In other embodiments, notifying the processing unit of the scheduling may include a timed thread execution. The timed thread execution may include synchronizing, via a time monitor circuit, a clock of the processing unit with a global clock, monitoring, by the processing unit via the time monitor circuit, the clock of the processing unit with respect to the wakeup time, and determining that the wakeup time obtains. In such embodiments, the method may further include resuming the execution of the thread in response to determining that the wakeup time obtains.

In some embodiments the thread may include a multiplexed thread, where the multiplexed thread is executed on the core of the processing unit. In certain embodiments, the multiplexed thread may include a plurality of time critical tasks including the time critical task, where each of the plurality of time critical tasks has respective timing information, and where each of the plurality of time critical tasks is executed in accordance with the respective timing information. In other embodiments, the multiplexed thread may include one or more time critical tasks and a best effort task, e.g., a non-time critical task. In such embodiments, the method may further include waking up the best effort task in response to the lateness timer expiring, executing the best effort task until the overall thread deadline obtains, resetting the lateness timer, suspending the thread and returning the thread to the idle state, thereby ensuring a timely wakeup of the thread for execution of another cycle of the time critical task. In certain embodiments, the method may also include receiving timing information for executing the best effort task and scheduling the best effort task. The scheduling of the best effort task may include determining, based on the received timing information, a start time for the best effort task, where the start time may be later than the time critical task deadline.

Additionally, a system for scheduling a time critical task may be provided that may implement embodiments of the methods described herein. The system may include a processing unit, a device configured as a hardware assist scheduler, and a memory coupled to the processing unit and the hardware assist scheduler.

The hardware assist scheduler may be configured to receive timing information for executing the time critical task, where the time critical task executes program instructions via a thread on a core of the processing unit. Further, the hardware assist scheduler may be configured to schedule the time critical task. To schedule the time critical task, the device may determine, based on the received timing information, a wakeup time, a thread cycle time, an overall thread deadline, and a time critical task deadline. In some embodiments, the overall thread deadline may be the difference between the thread cycle time and a system dependent suspend latency. Additionally, in certain embodiments, the time critical task deadline may be a function of the overall thread deadline and a specified thread bandwidth, where the specified thread bandwidth may indicate a fraction of the thread cycle time reserved for the time critical task.

Further the hardware assist scheduler may be configured to program a lateness timer based on the wakeup time and the time critical task deadline and wait for the wakeup time to obtain, e.g., wait for the wakeup time to arrive.

Additionally, the hardware assist scheduler may be configured to notify the processing unit of the schedule. To notify the processing unit of the schedule, the hardware assist scheduler may be configured to indicate to the processing unit that the thread is in an idle state, where the idle state may indicate that the thread is awake and ready to resume execution and execute the time critical task in accordance with the schedule. The hardware assist scheduler may also be configured to monitor the lateness timer and assert a thread interrupt in response to the lateness timer expiring. To assert the thread interrupt, the hardware assist scheduler may be configured to interrupt execution of the thread on the core of the processing unit, thereby suspending execution of the time critical task. In some embodiments, to suspend execution of the time critical task, the hardware assist scheduler may be further configured to suspend execution of the thread and return the thread to the idle state, thereby ensuring a timely wakeup of the thread for execution of another cycle of the time critical task.

The processing unit may be configured to resume execution of the thread upon notification that the thread is in the idle state and execute the time critical task on the thread.

In some embodiments, to notify the processing unit of the schedule, the hardware assist scheduler may be further configured to perform a memory write to the memory. In such embodiments, the processing unit may be further configured to monitor the memory for the memory write.

In other embodiments, to notify the processing unit of the schedule, the hardware assist scheduler may further configured to provide a global clock signal. In such embodiments, the processing unit may be further configured to perform a timed thread execution. The processing unit to perform the timed thread execution, may be configured to synchronize, via a time monitor circuit, a clock of the processing unit with the global clock, monitor, via the time monitor circuit, the clock of the processing unit with respect to the wakeup time, determine that the wakeup time obtains, and resume the execution of the thread in response to the wakeup time obtaining.

In certain embodiments, the thread may include a multiplexed thread, where the multiplexed thread is executed on the core of the processing unit. In some embodiments the multiplexed thread may include a plurality of time critical tasks including the time critical task, where each of the plurality of time critical tasks has respective timing information, and where each of the plurality of time critical tasks is executed in accordance with the respective timing information.

In other embodiments, the multiplexed thread may include one or more time critical tasks and a best effort task. In such embodiments, the hardware assist scheduler may be further configured to wake up the best effort task in response to the lateness timer expiring, notify the processing unit that the best effort task is awake and ready to be executed, reset the lateness timer, suspend the thread, and return the thread to the idle state, thereby ensuring a timely wakeup of the thread for execution of another cycle of the time critical task. In an exemplary embodiment, the hardware assist scheduler may be further configured to receive timing information for executing the best effort task and schedule the best effort task. To schedule the best effort task, the hardware assist scheduler may be configured to determine, based on the received timing information, a start time for the best effort task, where the start time may be later than the time critical task deadline.

In some embodiments, the processing unit may include a plurality of cores. In such embodiments, the hardware assist scheduler may include a core of the plurality of cores of the processing unit. Additionally, the time critical tasks may execute on at least one other core of the plurality of cores of the processing unit. In other embodiments, the processing unit may include a first processing unit, and the hardware assist scheduler may include a second processing unit.

In certain embodiments, the system may further include an interconnect, where the interconnect communicatively couples the hardware assist scheduler to the memory and to the processing unit. In some embodiments, the interconnect may include a high speed interconnect. In other embodiments, the interconnect may include a photonics interconnect.

BRIEF DESCRIPTION OF THE DRAWINGS

A better understanding of the present invention can be obtained when the following detailed description of the preferred embodiment is considered in conjunction with the following drawings, in which.

Figure 1A:
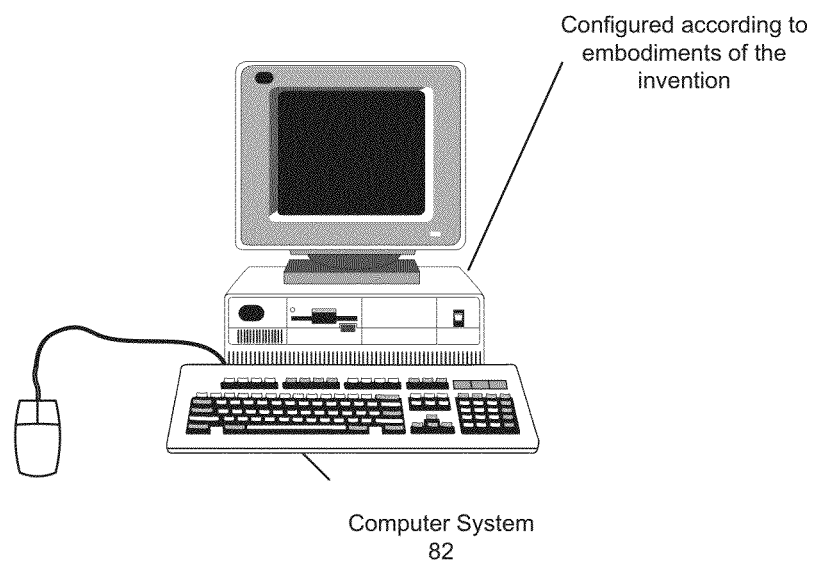
FIG. 1A illustrates a computer system configured to execute program instructions according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. patent application Ser. No. 13/594,088, entitled "Hardware Assisted Real-time Scheduler Using Memory Monitoring" filed on Aug. 24, 2012.

U.S. Provisional Patent Application No. 61/714,006, entitled "Time Monitoring in a Processing Element and Use" filed on Oct. 15, 2012.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Time Critical Task—refers to a task in a real time computer system used to execute program instructions that need to meet deadlines, e.g., not run late.

Best Effort Task—refers to a task in a real time computer system used to execute program instructions that does not have a timeliness requirement, e.g., do not need to meet a deadline. Examples include, but are not limited to, non-time critical programs such as logging status, responding to user interface commands, monitoring health of the system, and so forth.

Thread—refers to the smallest sequence of programming instructions that an operating system scheduler can manage independently.

FIG. 1A—Computer System

FIG. 1A illustrates a computer system 82 configured to execute program instructions according to an embodiment of the present invention. One embodiment of a method for implementing an embodiment of the present invention is described below in reference to FIG. 10.

As shown in FIG. 1A, the computer system 82 may include a display device configured to display a graphical program as the graphical program is created and/or executed. The display device may also be configured to display a graphical user interface or front panel of the graphical program during execution of the graphical program. The graphical user interface may comprise any type of graphical user interface, e.g., depending on the computing platform.

The computer system 82 may be configured as a system for scheduling a time critical task and may include at least one processing element, a device configured as a hardware assist scheduler and a memory coupled to the processing element and the hardware assist scheduler according to one embodiment of the present invention. Examples of a processing element include, but are not limited to, circuits such as an ASIC (Application Specific Integrated Circuit), portions or circuits of individual processor cores, entire processor cores, individual processors, such as processing units, programmable hardware devices such as a field programmable gate array (FPGA), and/or larger portions of systems that include multiple processors, as well as any combinations thereof. Additionally, a hardware assist scheduler may be implemented on any type of processing element, either as an integral part of the computing system or as a peripheral device communicatively coupled to the computer system via an interconnect.

Figure 1B:
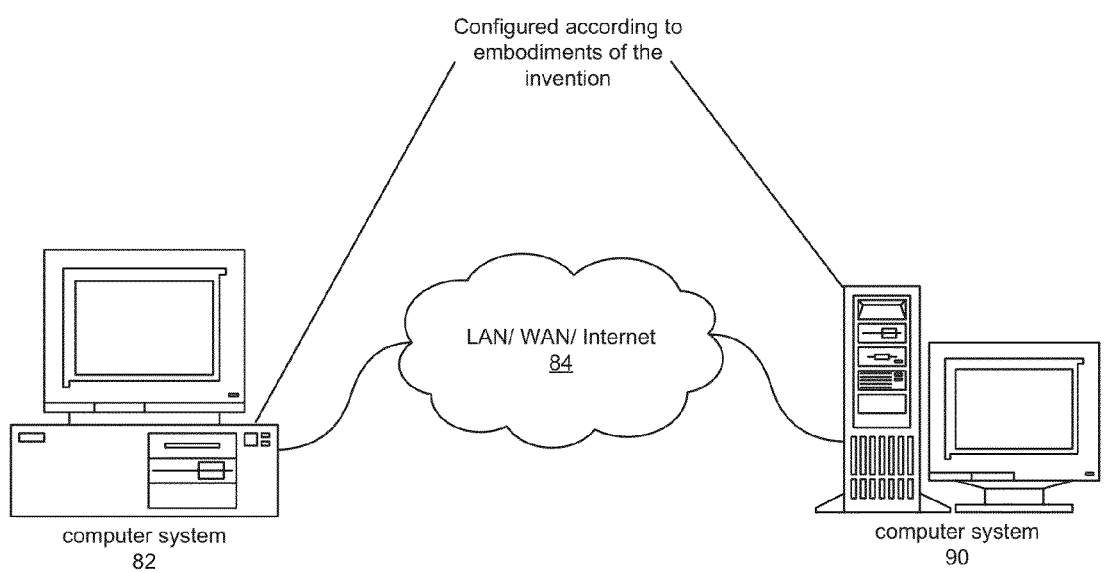
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. According to various embodiments of the present invention, a system for scheduling a time critical task may include a processing unit included in computer system 82 and a device configured as a hardware assist scheduler included in computer system 90 where the processing unit and hardware assist scheduler are coupled to a memory included in either computer system 82 or computer system 90 via an interconnect.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the system for scheduling a time critical task may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
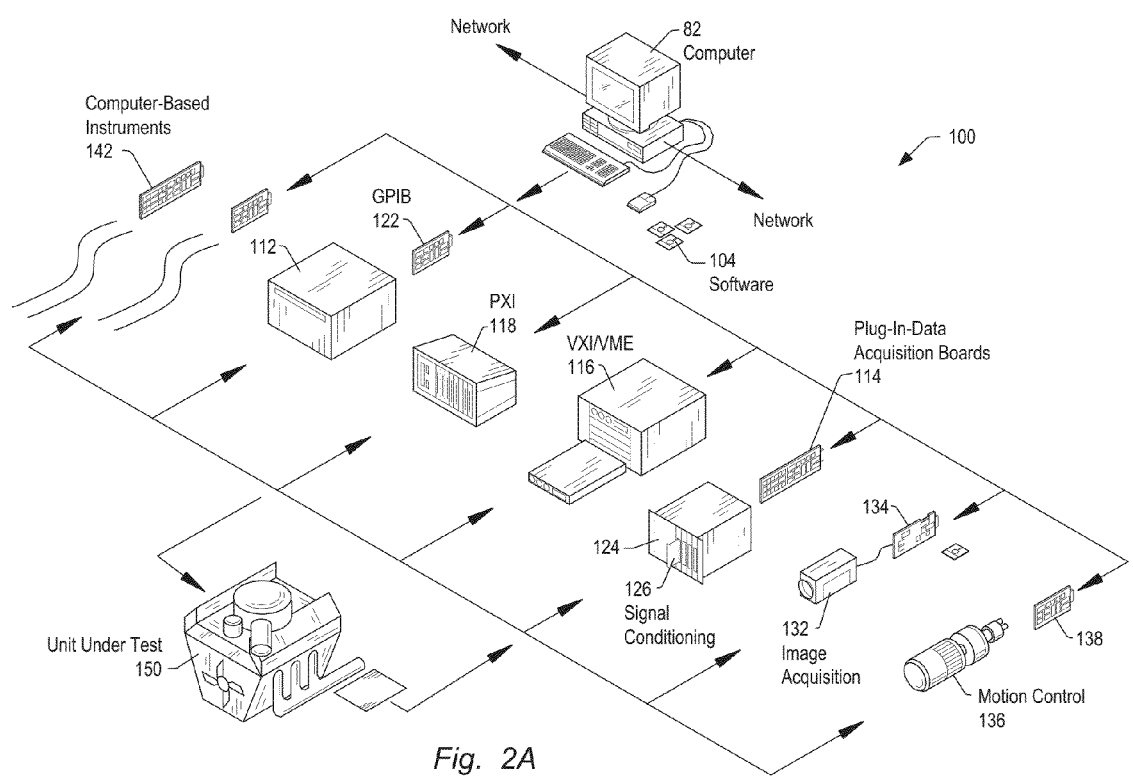
FIG. 2A illustrates an instrumentation control system that may implement an embodiment of the present invention.

FIG. 2A illustrates an exemplary instrumentation control system 100 which may implement embodiments of the invention. The system 100 comprises a host computer 82 which couples to one or more instruments. The host computer 82 may comprise a CPU, which may be configured with various embodiments of the present invention, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
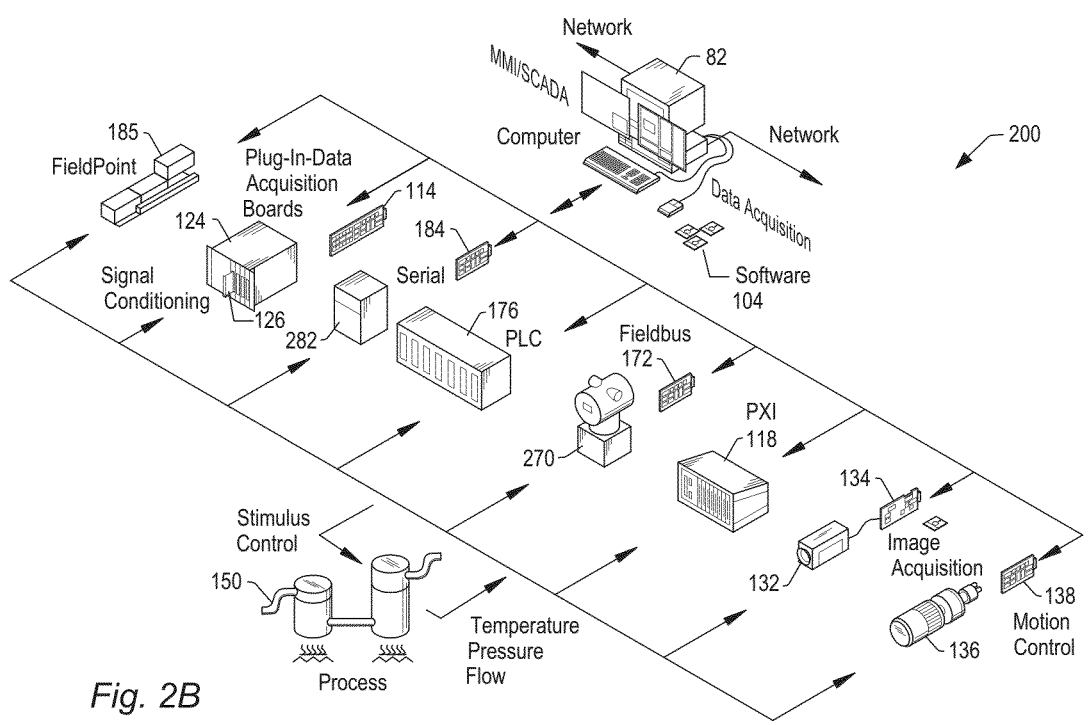
FIG. 2B illustrates an industrial automation system that may implement an embodiment of the present invention.

FIG. 2B illustrates an exemplary industrial automation system 200 which may implement embodiments of the invention. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU, which may be configured with various embodiments of the present invention, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as the Fieldpoint system available from National Instruments, among other types of devices.

Figure 3:
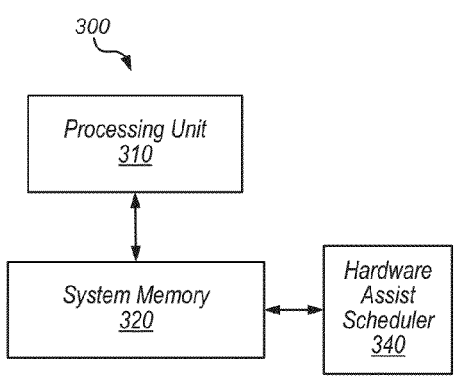
FIG. 3 is an exemplary block diagram of a computer system, according to an embodiment of the present invention.

FIG. 3 illustrates an exemplary system 300 for scheduling a time critical task. The exemplary system may include a processing unit 310. Note, while the exemplary system may include a processing unit, it is envisioned that any of a variety of processing elements, or functional units, may be used in the system for scheduling a time critical task. The processing unit 310 may be coupled to a memory, such as system memory 320. Further, the system memory 320 may be coupled to a device such as hardware assist scheduler 340. The hardware assist scheduler 340 may be implemented on any type of processing element, including as a second processing unit, either as an integral part of the computing system or as a peripheral device communicatively coupled to the computer system via an interconnect. The hardware assist scheduler 340 may be configured to receive timing information for executing the time critical task. The time critical task may execute program instructions via a thread on a core a processing unit, such as processing unit 310. Note that a thread refers to the smallest sequence of programming instructions that an operating system scheduler can manage independently. The hardware assist scheduler 340 may schedule the time critical task by determining, based on the received timing information, a wakeup time, a thread cycle time, an overall thread deadline, and a time critical task deadline. In certain embodiments, the overall thread deadline may be the difference between the thread cycle time and a system dependent suspend latency, e.g., the system specific time required to suspend the thread. In some embodiments, the time critical task deadline may be a function of the overall thread deadline and a specified thread bandwidth. In an exemplary embodiment, the thread bandwidth may indicate a fraction of the thread cycle time reserved for the time critical task. In other embodiments, the thread bandwidth may indicate a percentage of the thread cycle time reserved for the time critical task.

Further, the hardware assist scheduler 340 may program a timer, referred to herein as a lateness timer for convenience, based on the wakeup time and the time critical task deadline and wait for the wakeup time to obtain, e.g., wait for the condition of the wakeup time to be achieved. In other words, the hardware assist scheduler 340 will monitor the time and wait for a specified time, e.g., the wakeup time, to arrive. Additionally, the hardware assist scheduler 340 may be configured to notify the processing unit 310 of the schedule. To notify the processing unit 310, the hardware assist scheduler 340 may be configured to indicate to the processing unit 310 that the thread is in an idle state, where the idle state of the thread may indicate that the thread is awake and ready to resume execution and execute the time critical task in accordance with the schedule.

The processing unit 310 may be configured to resume execution of the thread upon notification that the thread is in the idle state and execute the time critical task on the thread. The hardware assist scheduler 340 may be further configured to monitor the lateness timer and assert a thread interrupt in response to the lateness time expiring. Additionally, the hardware assist scheduler 340, in order to assert the thread interrupt, may be configured to interrupt execution of the thread on the core of the processing unit 310 causing the execution of the time critical task to be suspended. In other words, the interrupt is only used to stop the execution of a task and never used to start the execution of a task. In certain embodiments, the hardware assist scheduler 340, in order to suspend the execution of the time critical task, may be further configured to suspend the execution of the thread and return the thread to the idle state, ensuring a timely wakeup of the thread for execution of another cycle of the time critical task.

In some embodiments, the thread may include a multiplexed thread, e.g., a thread programmed to execute multiple tasks sequentially. The multiplexed thread may be executed on the core of a processing unit, such as processing unit 310. In an exemplary embodiment, the thread may include a plurality of time critical tasks, including the time critical task discussed previously. Further, each of the plurality of time critical tasks may have respective timing information and may each be executed in accordance with the respective timing information, e.g., each respective time critical task may have respective timing information such that the hardware assist scheduler 340 may schedule each respective time critical task by determining, based on each respective received timing information, a respective wakeup time, a respective thread cycle time, a respective overall thread deadline, and a respective time critical task deadline. In other embodiments where the thread comprises a multiplexed thread that may be executed on the core of the processing system, the multiplexed thread may include one or more time critical tasks and a best effort task. A best effort task refers to a task in a real time computer system used to execute program instructions that do not have a timeliness requirement, e.g., does not need to meet a deadline. Examples include, but are not limited to, non-time critical programs such as logging status, responding to user interface commands, monitoring health of the system, and so forth.

In some embodiments involving best effort tasks, the hardware assist scheduler 340 may be further configured to wake up the best effort task in response to the lateness timer expiring and notify the processing unit 310 that the best effort task is awake and ready to be executed. Additionally, the hardware assist scheduler 340 may be further configured to reset the lateness time, suspend the thread, and return the thread to the idle state, ensuring a timely wakeup of the thread for execution of another cycle of the time critical task.

In certain embodiments, the hardware assist scheduler 340 may be further configured to receive timing information for executing the best effort task. The hardware assist scheduler 340 may then be configured to schedule the best effort task by determining, based on the received timing information, a start time for the best effort task where the start time for the best effort task is later than the time critical task deadline. Specification of a precise start time for the best effort tasks may allow the hardware assist scheduler 340 to offset access to shared resources, such as the processing unit's cache, the system memory 320, and so forth.

In other embodiments involving best effort tasks, the thread may be one of a plurality of threads executing on the core of the processing unit 310. In such embodiments, a thread of the plurality of threads may be dedicated to execution of best effort tasks. In such instances, the hardware assist scheduler 340 may be used to trigger the execution of the best effort tasks at a specified start time such that the execution of the best effort tasks does not conflict with time critical tasks being executed on another one or more of the plurality of threads executing on the core of the processing unit 310.

Figure 4:
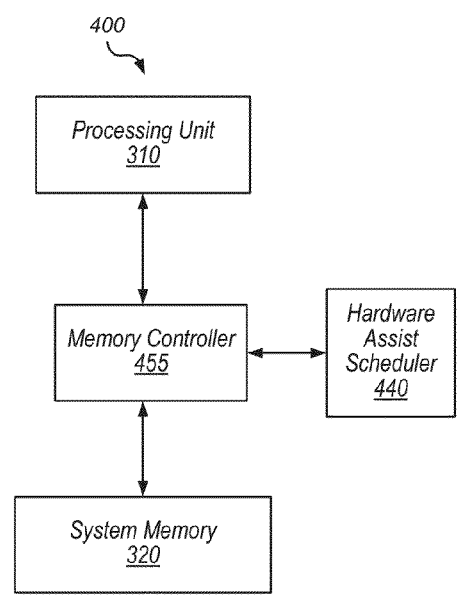
FIG. 4 is an exemplary block diagram of a computer system, according to an embodiment of the present invention.

FIG. 4 illustrates an exemplary system 400 for scheduling a time critical task according to an embodiment of the present invention. In system 400, processing unit 310, as described in detail above, may be coupled to system memory 320 via memory controller 455. Additionally, hardware assist scheduler 440 may be coupled to system memory 320 via memory controller 455.

Hardware assist scheduler 440 may incorporate all of the functionality discussed above with regards to hardware assist scheduler 340. In addition, in some embodiments, hardware assist scheduler 440, in order to notify the processing unit 310 of the schedule, may be further configured to perform a memory write to system memory 320 via memory controller 455. Further, the processing unit 310 may be further configured to monitor the system memory for the memory write. This so called "memory monitoring methodology" is fully described in pending U.S. patent application Ser. No. 13/594,088, entitled "Hardware Assisted Real-time Scheduler Using Memory Monitoring" filed on Aug. 24, 2012, and fully incorporated herein. In brief, the hardware assist scheduler 440, in certain embodiments, may be further configured to generate or modify a schedule of one or more tasks, causing a new schedule to be created and write to a specified location in the memory, indicating that the new schedule has been created. Further, the processing unit 310 may be further configured to monitor for a write to the specified location in the memory and execute the one or more tasks in accordance with the new schedule in response to detecting the write to the specified location in the memory.

Figure 5:
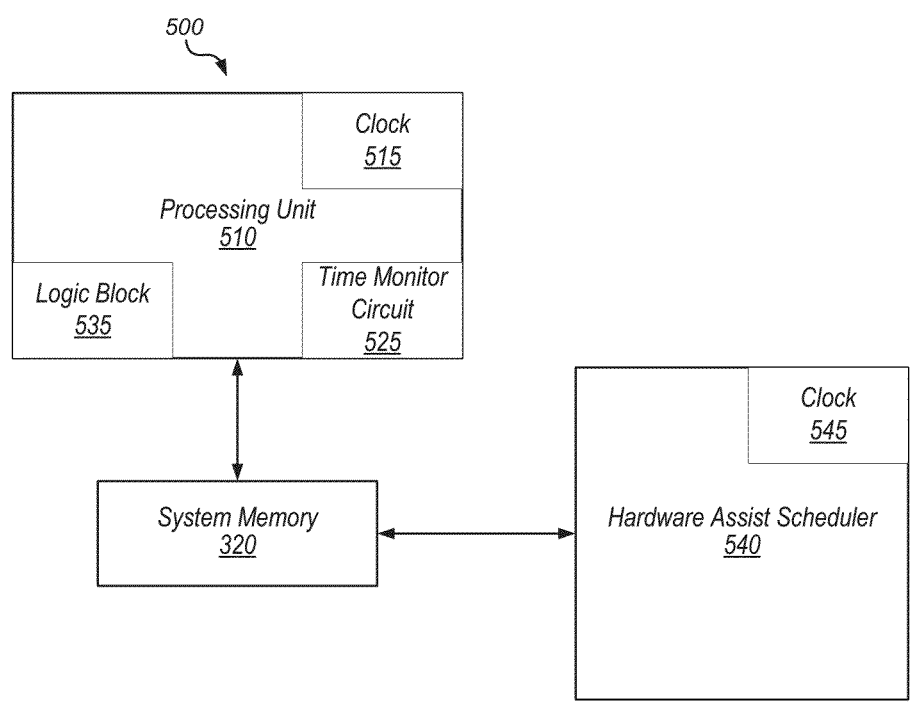
FIG. 5 is an exemplary block diagram of a computer system, according to an embodiment of the present invention.

FIG. 5 illustrates an exemplary system 500 for scheduling a time critical task according to an embodiment of the present invention. In system 500, the hardware assist scheduler 540, which may incorporate all of the features fully described above in reference to hardware scheduler 340, including being coupled to system memory 320, may be further configured to provide a global clock signal for the system 500 via clock 545. Additionally, processing unit 510, in addition to incorporating all of the features fully described above in reference to processing unit 310, may be further configured to perform a timed thread execution. The processing unit 510, in order to perform the timed thread execution may be configured to synchronize, via a time monitor circuit, a clock 515 of the processing unit with the global clock 545, monitor, via the time monitor circuit, the clock of the processing unit with respect to the wakeup time, and determine that the wakeup time obtains. Further, the processing unit 510, may, in response to the wakeup time obtaining, resume the execution of the thread. The "time monitor circuit" and use thereof, is fully described in pending U.S. Provisional Patent Application No. 61/714,006, entitled "Time Monitoring in a Processing Element and Use" filed on Oct. 15, 2012, and fully incorporated herein. In brief, in some embodiments, processing unit 510 may include clock 515, a thread suspend/resume logic block 535, and a time monitor circuit 525. The thread suspend/resume logic block 535, in some embodiments, may be configured to suspend execution of a thread in response to a received suspend thread instruction. Further, the time monitor circuit 525 may be configured to receive an indication of a wakeup time, monitor time via clock 515 until the wakeup time obtains, and invoke the thread suspend/resume logic block 535 to resume execution of the thread in response to the wakeup time obtaining. In other words, the time monitor circuit 525 may utilize clock 515 of the processing element 510 to determine when the wakeup time has arrived and resume execution of the thread.

In other embodiments, clock 545 of hardware assist scheduler 540 may be configured to synchronize with a global clock. In such embodiments, clock 515 of processing unit 510 would be configured to synchronize with the global clock such that clock 515 would be synchronized in phase and frequency with clock 545 via synchronization to a global clock.

Figure 6:
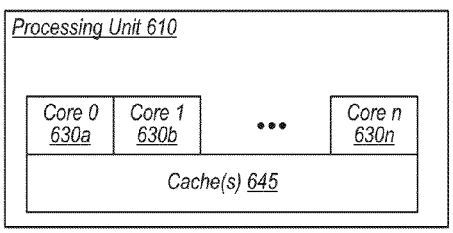
FIG. 6 is an exemplary block diagram of a processing unit, according to an embodiment of the present invention.

FIG. 6 illustrates an exemplary multicore processing unit 610 for scheduling and executing time critical tasks. Processing unit 610 may include a plurality of cores, e.g., cores 630a, 630b, and so forth through core 630n, and collectively referred to as cores 630. Cores 630 may be coupled to local cache 645. In some embodiments, a hardware assist scheduler, as fully described above in reference to hardware assist schedulers 340, 440, and 540 may be included on a core of the plurality of cores 630, e.g., core 630a. Further, the time critical tasks may execute on at least one other core of the plurality of cores 630 of the processing unit 610. For example, the hardware assist scheduler may be included on core 630a while the time critical tasks may be executed on core 630b, or cores 630b through 630n. In some embodiments, where the hardware assist scheduler is included on a core of the processing unit 610, the memory monitor methodology as described above with reference to FIG. 4 may be fully incorporated into processing unit 610. Further, in other embodiments, where the hardware assist scheduler is included on a core of the processing unit 610, the time monitor circuit as described above with reference to FIG. 5 may be fully incorporated into processing unit 610.

Figure 7:
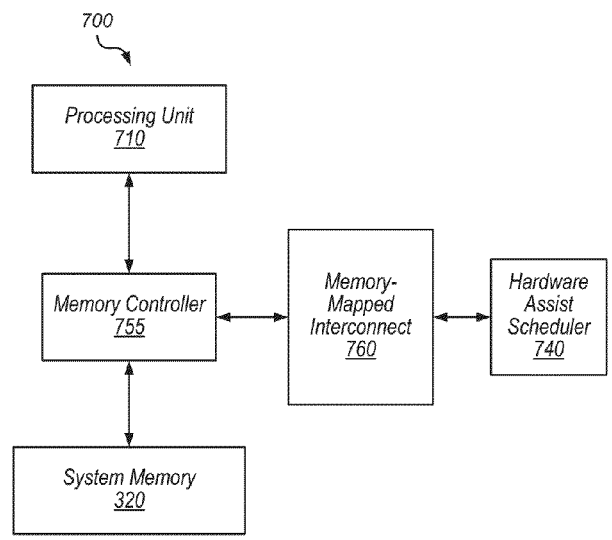
FIG. 7 is an exemplary block diagram of a computer system, according to an embodiment of the present invention.

FIG. 7 illustrates an exemplary system 700 for scheduling a time critical task according to an embodiment of the present invention. In system 700, processing unit 710, which may configured to as described above with regards to processing units 310 and 510, may be communicatively coupled to a system memory 320 via a memory controller 755. Further, memory controller 755 may be communicatively coupled to a memory-mapped interconnect 760. In some embodiments, the memory-mapped interconnect 760 may include a high speed interconnect. Examples of high speed interconnects include PCI Express (PCIe) switches, RapidIO switches, 100G Ethernet (100 GbE), active optical cables for Ethernet, QUICKPATH interconnect (QPI) or HYPERTRANSPORT® interconnect and Thunderbolt. In other embodiments, memory-mapped interconnect 760 may include a photonics interconnect, e.g., a high speed fiber optic interconnect.

Hardware assist scheduler 740 may be communicatively coupled to the system memory via the memory-mapped interconnect 760 and the memory controller 755. In some embodiments, the hardware assist scheduler may be configured as described above in reference to hardware assist scheduler 340 of FIG. 3. In other embodiments, hardware assist scheduler 740 may be configured as described above in reference to hardware assist scheduler 440 of FIG. 4. Additionally, in yet other embodiments, hardware assist scheduler 740 may be configured as described above in reference to hardware assist scheduler 540.

FIG. 8—Flowchart

Figure 8:
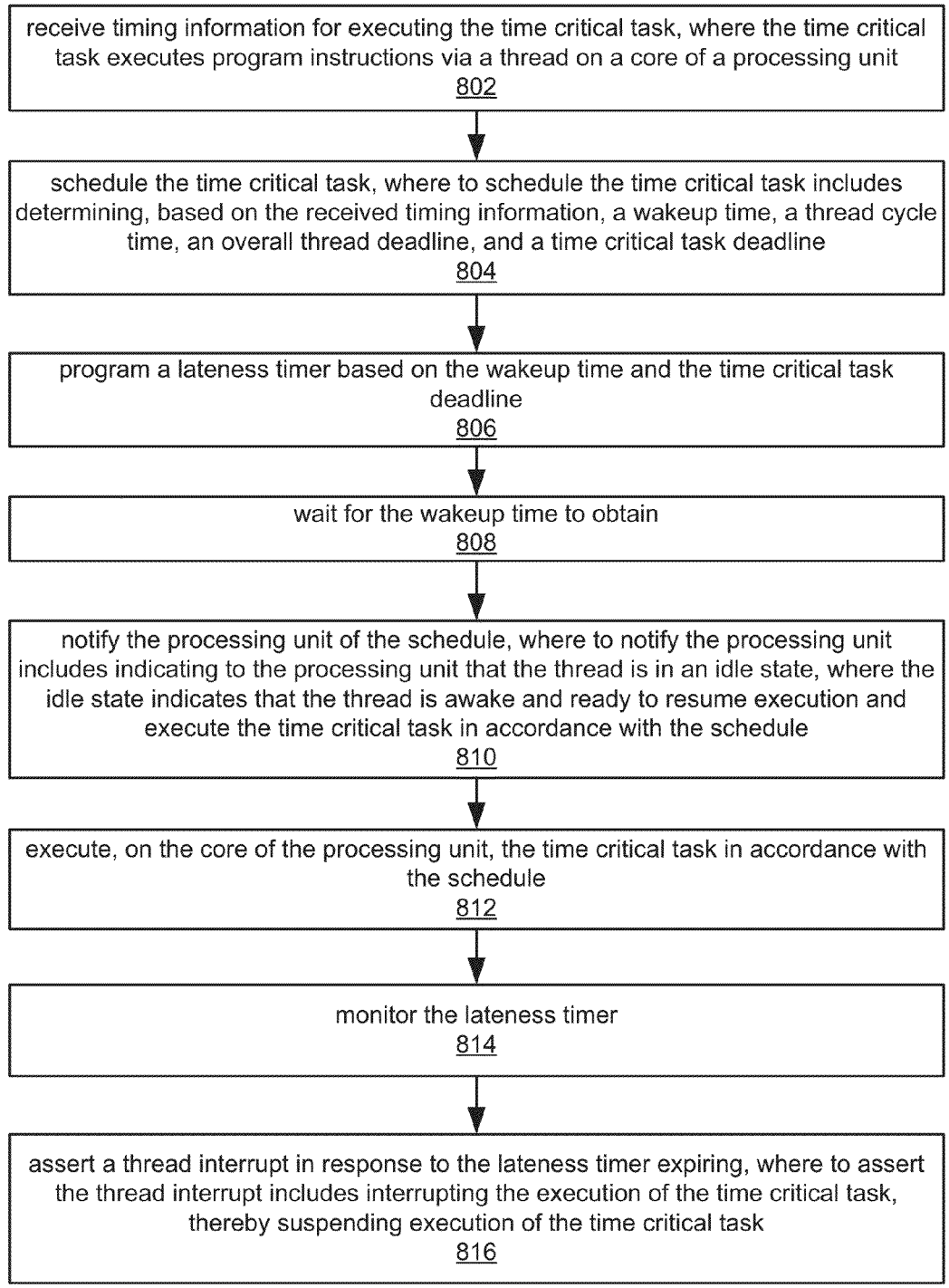
FIG. 8 is an exemplary flow chart of a method for implementing an embodiment of the present invention.

FIG. 8 illustrates a method for monitoring a time critical task. Note, that the method described below may be fully implemented using any of the above described systems and embodiments. While the method is fully described, it must be noted that not all steps may be necessary or may be performed in an order other than described below.

In 802, timing information for executing the time critical task may be received. The time critical task may execute program instructions via a thread on a core of a processing unit, such as processing units 310, 510, 610, and 710 described in detail above in reference to FIGS. 3 through 7.

In 804, the time critical task may be scheduled. Scheduling the time critical task may include determining, based on the received timing information, a wakeup time, a thread cycle time, an overall thread deadline, and a time critical task deadline. In some embodiments, the overall thread deadline may be the difference between the thread cycle time and a system dependent suspend latency.

In 806, a lateness time based on the wakeup time and the time critical task deadline may be programmed. In certain embodiments, the time critical task deadline may be a function of the overall thread deadline and a specified thread bandwidth, where the specified thread bandwidth may indicate a fraction of the thread cycle time reserved for the time critical task. In other embodiments, the time critical task deadline may be a function of the overall thread deadline and a specified thread bandwidth, where the specified thread bandwidth may indicate a percentage of the thread cycle time reserved for the time critical task.

In 808, the obtainment of the wakeup time is waited for. In other words, the arrival of the wakeup time is awaited.

In 810, the processing unit is notified of the schedule, where the notifying indicates to the processing unit that the thread is in an idle state. The idle state indicates that the thread is awake and ready to resume execution and execute the time critical task in accordance with the schedule. In some embodiments, the notifying may include a memory write to a memory of the processing unit and the processing unit monitoring the memory for a write to indicate the notification. In such embodiments, the methods described above in reference to U.S. patent application Ser. No. 13/594,088, entitled "Hardware Assisted Real-time Scheduler Using Memory Monitoring" filed on Aug. 24, 2012 may be incorporated. In other embodiments, the notifying may include a timed thread execution where the timed thread execution includes synchronizing, via a time monitor circuit, as fully described in U.S. Provisional Patent Application No. 61/714,006, entitled "Time Monitoring in a Processing Element and Use" filed on Oct. 15, 2012, with a global clock and monitoring, by the processing unit via the time monitor circuit, the clock of the processing unit with respect to the wakeup time. Additionally, in such embodiments, the processing unit may determine that the wakeup time obtains and the thread execution may be resumed in response to determining that the wakeup time obtained, e.g., the time to wakeup the thread has arrived.

In 812, the time critical task may be executed on the core of the processing unit in accordance with the schedule determined in 804.

In 814, the lateness timer may be monitored.

In 816, in response to the lateness timer expiring, a thread interrupt may be asserted, where asserting the thread interrupt interrupts the execution of the thread and suspends execution of the time critical task. In some embodiments, suspending execution of the time critical task may include suspending execution of the thread and returning the thread to the idle state to ensure a timely wakeup of the thread for execution of another cycle of the time critical task.

In certain embodiments of the above described method, the thread may include a multiplexed thread where the multiplexed thread is executed on the core of the processing unit. In some embodiments, the multiplexed thread may include a plurality of time critical tasks, including the time critical task, where each of the plurality of time critical tasks has respective timing information. Thus, each of the plurality of time critical tasks is executed in accordance with the respective timing information. In other embodiments, the multiplexed thread may include one or more time critical tasks and a best effort task. In such embodiments, the method may further include waking up the best effort task in response to the lateness timer expiring and executing the best effort task until the overall thread deadline obtains. In other words, the best effort tasks, e.g., the non-time critical tasks, may be executed until the overall thread deadline arrives. Then, the lateness timer may be reset, execution of the thread may be suspended, and the thread may be returned to the idle state. Returning the thread to the idle state may ensure a timely wakeup of the thread for execution of another cycle of the time critical task.

Further, in certain embodiments involving best effort tasks, timing information for executing the best effort task may be received. Thus, the best effort task may be scheduled. The scheduling of the best effort task may include determining, based on the received timing information, a start time for the best effort task. The start time for the best effort task may be later than the time critical task deadline.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for monitoring a time critical task, the method comprising:
    determining a schedule for the time critical task based on received timing information, wherein the time critical task executes program instructions via a thread on a core of a processing unit, wherein the time critical task is a function of the overall thread deadline and a specified thread bandwidth, and wherein said determining comprises determining a wakeup time, a thread cycle time, and an overall thread deadline;

executing, on the core of the processing unit, the time critical task in accordance with the schedule; and suspending execution of the time critical task via assertion of a thread interrupt in response to a lateness timer expiring, wherein the lateness timer is based on the wakeup time and the time critical task deadline.

2. The method of claim 1, further comprising:

notifying the processing unit that the thread is in an idle state, wherein the idle state indicates that the thread is awake and ready to resume execution and execute the time critical task in accordance with the schedule.

3. The method of claim 2, wherein said notifying comprises a memory write to a memory of the processing unit;

wherein the method further comprises monitoring the memory, by the processing unit, for the memory write to indicate said notifying.

4. The method of claim 2, wherein said notifying comprises a timed thread execution;

wherein the timed thread execution comprises:

synchronizing, via a time monitor circuit, a clock of the processing unit with a global clock;

monitoring, by the processing unit via the time monitor circuit, the clock of the processing unit with respect to the wakeup time; and determining that the wakeup time obtains; and wherein the method further comprises:

resuming the execution of the thread in response to said determining that the wakeup time obtains.

5. The method of claim 1, wherein the overall thread deadline is based on the difference between the thread cycle time and a system dependent suspend latency.

6. The method of claim 1, wherein said suspending execution of the time critical task comprises:

suspending execution of the thread; and returning the thread to an idle state, thereby ensuring a timely wakeup of the thread for execution of another cycle of the time critical task.

7. The method of claim 1, wherein the time critical task deadline is a function of the overall thread deadline and a specified thread bandwidth, and wherein the specified thread bandwidth indicates a fraction of the thread cycle time reserved for the time critical task.

8. The method of claim 1, wherein the thread comprises a multiplexed thread, wherein the multiplexed thread is executed on the core of the processing unit, and wherein the multiplexed thread comprises:

one or more time critical tasks; and a best effort task.

9. A system for scheduling a time critical task, the system comprising:

a processing unit;

a device configured as a hardware assist scheduler; and a memory coupled to the processing unit and the hardware assist scheduler;

wherein the hardware assist scheduler is configured to:

determine a schedule for the time critical task based on received timing information, wherein the time critical task executes program instructions via a thread on a core of the processing unit, wherein the time critical task is a function of the overall thread deadline and a specified thread bandwidth, and wherein said determining comprises determining a wakeup time, a thread cycle time, and an overall thread deadline; and wherein the processing unit is configured to execute the time critical task in accordance with the schedule; and wherein the hardware assist scheduler is further configured to suspend execution of the time critical task via assertion of a thread interrupt in response to a lateness timer expiring, wherein the lateness timer is based on the wakeup time and the time critical task deadline.

10. The system of claim 9, wherein the hardware assist scheduler is further configured to notify the processing unit that the thread is in an idle state, and wherein the idle state indicates that the thread is awake and ready to resume execution and execute the time critical task in accordance with the schedule.

11. The system of claim 10, wherein said notifying comprises a memory write to a memory of the processing unit; and wherein the processing unit is further configured to monitor the memory for the memory write to indicate said notifying.

12. The system of claim 9, wherein the hardware assist scheduler is further configured to provide a global clock signal; and wherein the processing unit is further configured to:

perform a timed thread execution, wherein to perform the timed thread execution, the processing unit is configured to:

synchronize, via a time monitor circuit, a clock of the processing unit with the global clock;

monitor, via the time monitor circuit, the clock of the processing unit with respect to the wakeup time; and determine that the wakeup time obtains; and resume the execution of the thread in response to the wakeup time obtaining.

13. The system of claim 9, wherein the overall thread deadline is based on the difference between the thread cycle time and a system dependent suspend latency.

14. The system of claim 9, wherein, to suspend execution of the time critical task, the hardware assist scheduler is further configured to:

suspend execution of the thread; and return the thread to an idle state, thereby ensuring a timely wakeup of the thread for execution of another cycle of the time critical task.

15. The system of claim 9, wherein the time critical task deadline is a function of the overall thread deadline and a specified thread bandwidth, and wherein the specified thread bandwidth indicates a fraction of the thread cycle time reserved for the time critical task.

16. The system of claim 9, wherein the thread comprises a multiplexed thread, wherein the multiplexed thread is executed on the core of the processing unit, wherein the multiplexed thread comprises:

one or more time critical tasks; and a best effort task.

17. A non-transitory computer readable memory medium storing program instructions executable by at least one processor to:

determine a schedule for a time critical task based on received timing information, wherein the time critical task executes program instructions via a thread on a core of a processing unit, wherein the time critical task is a function of the overall thread deadline and a specified thread bandwidth, and wherein said determining comprises determining a wakeup time, a thread cycle time, and an overall thread deadline;

notify the processing unit that the thread is in an idle state, wherein the idle state indicates that the thread is awake and ready to resume execution and execute the time critical task in accordance with the schedule; and suspend execution of the time critical task via assertion of a thread interrupt in response to a lateness timer expiring, wherein the lateness timer is based on the wakeup time and the time critical task deadline.

18. The non-transitory computer readable memory medium of claim 17,
wherein to notify the processing unit, the program instructions are further executable to perform a memory write to a memory of the processing unit.

19. The non-transitory computer readable memory medium of claim 17,
wherein the overall thread deadline is based on the difference between the thread cycle time and a system dependent suspend latency.

20. The non-transitory computer readable memory medium of claim 17,
wherein the time critical task deadline is a function of the overall thread deadline and a specified thread bandwidth, and wherein the specified thread bandwidth indicates a fraction of the thread cycle time reserved for the time critical task.

* * * * *